United States Patent [19]
Robinson

[11] Patent Number: 5,764,386
[45] Date of Patent: Jun. 9, 1998

[54] METHOD AND SYSTEM FOR AUTOMATICALLY MONITORING THE COLORS OF AN OBJECT AT A VISION STATION

[75] Inventor: David A. Robinson, Northants, Great Britain

[73] Assignee: Medar, Inc., Farmington Hills, Mich.

[21] Appl. No.: 591,027

[22] Filed: Jan. 25, 1996

[51] Int. Cl.⁶ .................. H04N 1/46; G03F 3/10; G03F 3/08
[52] U.S. Cl. .................. 358/504; 358/518; 358/527; 382/162; 382/167; 348/181; 348/187; 348/263
[58] Field of Search .................. 358/504, 518, 358/527, 406; 395/109; 382/217, 218, 219, 220, 274, 162, 167; 348/180, 181, 182, 187, 188, 263, 587, 630, 655, 675

[56] References Cited

U.S. PATENT DOCUMENTS

| 5,018,213 | 5/1991 | Sikes | 382/141 |
| 5,479,584 | 12/1995 | Curry | 395/109 |
| 5,481,619 | 1/1996 | Schwartz et al. | 382/217 |
| 5,537,516 | 7/1996 | Sherman et al. | 395/109 |
| 5,649,073 | 7/1997 | Knox et al. | 395/109 |

FOREIGN PATENT DOCUMENTS

95 31333  12/1994  WIPO .................. B41F 5/06

*Primary Examiner*—Kim Yen Vu
*Assistant Examiner*—Kimberly A. Williams
*Attorney, Agent, or Firm*—Brooks & Kushman P.C.

[57] ABSTRACT

Color balance of a sample image is compared with a previously learned template image utilizing an appropriately programmed machine vision system including a color camera at a vision station. The sample image, preferably captured from a web scanner attached directly to an offset printing machine, is compared with a previously generated "known good" template image. This comparison process produces four correction factors which are the ratios between the amount of each of four colored inks in the template image to that in the sample image. The four colored inks may be cyan, magenta, yellow, and black inks but inks of other colors could also be used. These correction factors can either be presented to an operator to manually adjust the machine or else used in an automatic feedback loop of a controller of the machine, thereby maintaining consistent image quality.

26 Claims, 4 Drawing Sheets

METHOD AND SYSTEM FOR AUTOMATICALLY MONITORING THE COLORS OF AN OBJECT AT A VISION STATION

CROSS-REFERENCE TO RELATED APPLICATION

This application is related to U.S. patent application entitled "Method and System for Automatically Calibrating a Color Camera in a Machine Vision System", filed on the same date as the present application.

TECHNICAL FIELD

This invention is related to methods and systems for monitoring colors and, in particular, to methods and systems for monitoring the colors of an object at a vision station.

BACKGROUND ART

In general, a large proportion of color printing is undertaken using the 4 color ink offset printing process. It relies on being able to approximately reproduce most colors using varying quantities of cyan, magenta, yellow and black inks.

In particular, color images in magazines, books, and newspapers are conventionally formed by a process that uses four printing plates and the four "process" inks (cyan, magenta, yellow and black). In this process, four films or "separations" are first made by scanning an original color image with an electronic scanner or by photographing the image through different colored filters.

When a photographic process is used, the filters are of colors complementary to the process ink colors. Thus, three separations are made by separately photographing the original image through red, blue, and green filters; the separations are used to make printing plates that will print cyan, yellow, and magenta inks, respectively. A fourth separation, used to make a printing plate that will print black ink, is made either by photographing the original through a combination of red, blue and green filters, or by photographing the original in black and white.

Once the separations are prepared, they are used to make four printing plates, each one corresponding to a process ink color. When used in combination, the printing plates generate a four-color image which, to the naked eye, appears to encompass the entire spectrum of colors and shades.

The U.S. patent to Kipphan et al. (U.S. Pat. No. 5,182,721) is entitled "Process and Apparatus for Controlling the Inking Process in A Printing Machine." Printed sheets produced by an offset printing machine are measured by photoelectric means in a series of test areas, for example in approximate preselected locations in the printed image or in an area of simultaneously printed color measuring fields. Control data are determined from the measurements obtained in this manner, the control data corresponding to color deviations of the printing inks used in printing the individual printing zones. A control panel produces adjusting signals from control data and regulates the ink control elements of the printing machine. A spectrometer spectrally decomposes and measures the reflected light. A computer determines the amount of control required based on the control data and adjusts the light sources illuminating the print area. Three-color and four-color embodiments are described herein.

The U.S. patent to Sainio et al. (U.S. Pat. No. 5,412,577) is entitled "Color Registration System for a Printing Press." A control system is described for controlling misregistration between the colors of an image printed on a web. The system includes an imaging device such as a camera, a processor and image conversion circuits coupled to the processor. In the preferred embodiment, four printing units each print one color of the image upon web. This kind of printing is commonly referred to as web offset printing. Colors on units are cyan (C), magenta (M), yellow (Y) and black (K). The system includes a print controller, a computer, a camera positioning unit, a camera assembly, and a printing plate scanner. The controller converts the signals from the computer into signals having suitable quality. The assembly is configured to scan a web for red (R), green (G), blue (B) and infrared (I). The U.S. patent also to Sainio (U.S. Pat. No. 4,887,530) describes a web registration control system.

The U.S. patent to Dotzel et al. (U.S. Pat. No. 4,667,596) is entitled "Method of Automatically Setting the Colors Printed Out by Flexographic Printing Machines for Four-Color Printing." In this device, before setting the printing colors, the correct color tint and strength of the four inks (yellow, magenta, cyan and black) are determined.

The U.S. patent to Wales et al. (U.S. Pat. No. 4,736,680) is entitled "Closed Loop Register Control." A control system is used in association with a printing press and comprises a television camera in combination with a strobe light and a solid state imaging device which enables continuous scanning of a sheet web. The television camera is manually aligned at start-up and scans a color standard. Variations from this standard are automatically transmitted as correction signals by a processor to cyan, black, yellow and magenta printing units.

The U.S. patent to Smilansky et al. (U.S. Pat. No. 5,339,176) is entitled "Apparatus and Method for Color Calibration." The technique disclosed therein includes the steps of comparing a first digital representation of a colored image with a second digital representation and employing a transformation to control the operation of a color processing device to be calibrated. This method applies to transparencies, printing and photography.

The U.S. patent to Brunetti et al. (U.S. Pat. No. 4,932,320) is entitled "Method and Device for Registering Colors in an Offset Rotary Press." This is a system for positioning a camera so that a scan window is above a color standard.

The U.S. patent to Benoit et al. (U.S. Pat. No. 4,706,206) is entitled "Color Printing Control Using Halftone Control Areas." A computer calculates color correction coefficients and a pressman makes the appropriate correction.

The U.S. patent to Abramson (U.S. Pat. No. 5,174,758) is entitled "Color Selector for Four-Color Offset Printing and Method of Creating It."

The U.S. patent to Kipphan et al. (U.S. Pat. No. 5,182,721) and the U.S. patent to Sainio (U.S. Pat. No. 4,887,530) are of a more general interest.

One problem associated with the prior art is that it is difficult to maintain consistent image quality. This task contains several major difficulties. First, although the inks are called cyan, magenta and yellow, they are rarely very pure colors, (indeed their colorimetric properties could easily vary from batch to batch, let alone between manufacturers). Second, each pixel consists of a mixture of up to 4 colors, yet there are only three measurements, namely red, green, and blue (RGB) when using a color camera.

SUMMARY OF THE INVENTION

An object of the present invention is to provide a method and system for automatically monitoring the colors of an object at a vision station in order to maintain consistent image quality.

In carrying out the above object and other objects of the present invention, a method is provided for automatically monitoring colors of an object at a vision station including a color camera. The method includes the steps of generating calibration data based on colors of a calibration target at the vision station, generating a template image containing a known good template of colored materials, and generating a current image of the object containing the colored materials. The method finally includes the step of processing the template image, the calibration data and the current image together to obtain a set of correction factors. Each of the correction factors represents a ratio of an amount of one colored material in the template image to an amount of the one colored material in the current image.

Preferably, each of the current and template images includes a plurality of pixels and the step of processing includes the steps of measuring any misregistration between the current and template images to obtain an offset and comparing the images pixel-by-pixel based on the offset to obtain a plurality of straight-line graphs wherein the correction factors are based on slopes of the straight-line graphs.

Still further in carrying out the above object and other objects of the present invention, a system is provided for carrying out the method steps.

Preferably, the method also includes the steps of providing a printing machine and adjusting the printing machine based on the set of correction factors.

Also, preferably, the colored materials are cyan, magenta, yellow and black inks but other colored inks could also be monitored.

The initial task is to get the system to learn the characteristics of the colored inks. This is preferably done by placing blocks of solid tone printed with the actual inks in the imaging field of a color balance system. Measurements are taken under standard conditions, and the camera calibration techniques described in the above-noted application are applied. Although any color coordinate system could be used to monitor the colors of the inks, the one most appropriate for this application is based on a color measurement system called CYANNESS and MAGENTANESS.

The color coordinates are measured in this color space. This needs only be done once per ink batch, and not at every cycle.

The next operation is to input a template test image. This could be a composite of several images together with a standard deviation image used to qualify which pixels are not to be used in the color monitoring process. As with the color block image, the image goes in under standard conditions.

The average template image is used to create a series of pseudo separations. These are four images corresponding to the black ink component and the cyan ink, magenta ink and Yellow ink components. The black ink component is computed from an undercolor removal algorithm. Once the black components have been computed, the cyan, magenta and yellow (i.e. CMY) components can be modified to take into account the undercolor removal. The resulting C, M, Y images can then be converted into decorrelated or decoupled ink axis images. A stage of iteration using these 4 separations is used to compute the resulting image when constructed using the actual inks. The resulting image is processed by a color balance algorithm and any suggested modification is applied to the separations. These 4 images are essentially digital equivalents to the photographic separations that produced the original printing plate.

During processing on the actual print line, samples are taken under standard conditions. This is achieved using a white calibration target. Under these conditions, any significant difference between the sample and template will be due to the quantity of ink being laid down on the web. The color of the picture is analyzed in terms of a pixel-by-pixel comparison in a manner that results in three straight line graphs being produced, one for cyan ink, one for magenta ink and one for yellow ink. The intercept of the graph represents the ratio of the black content of the sample to the template image, while the slope of each one represents the ratio of the appropriate color. These values can then be relatively simply processed to provide the ratio of actual impure color inks existing between sample and template images. These figures can then be either formatted and passed on to the operator or else processed and used to control the machine.

The above object and other objects, features, and advantages of the present invention are readily apparent from the following detailed description of the best mode for carrying out the invention when taken in connection with the accompanying drawings.

BEST MODES FOR CARRYING OUT THE INVENTION

The method and system of the present invention is primarily designed as an aid for the offset print industry. A large proportion of color printing is undertaken using the 4 color ink offset printing process. It relies on being able to approximately reproduce most colors using varying quantities of cyan, magenta, yellow and black inks. In general, this invention compares a sample image, preferably captured from a web scanner attached directly to a printing machine, with a previously generated 'known good' template. This comparison process produces four correction factors, which are the ratios between the amount of each of the colored inks in the template image to that in the sample image. These figures can either be presented to an operator allowing manual adjustment of the machine or else used in an automatic feedback loop to maintain consistent image quality.

Figure 1:
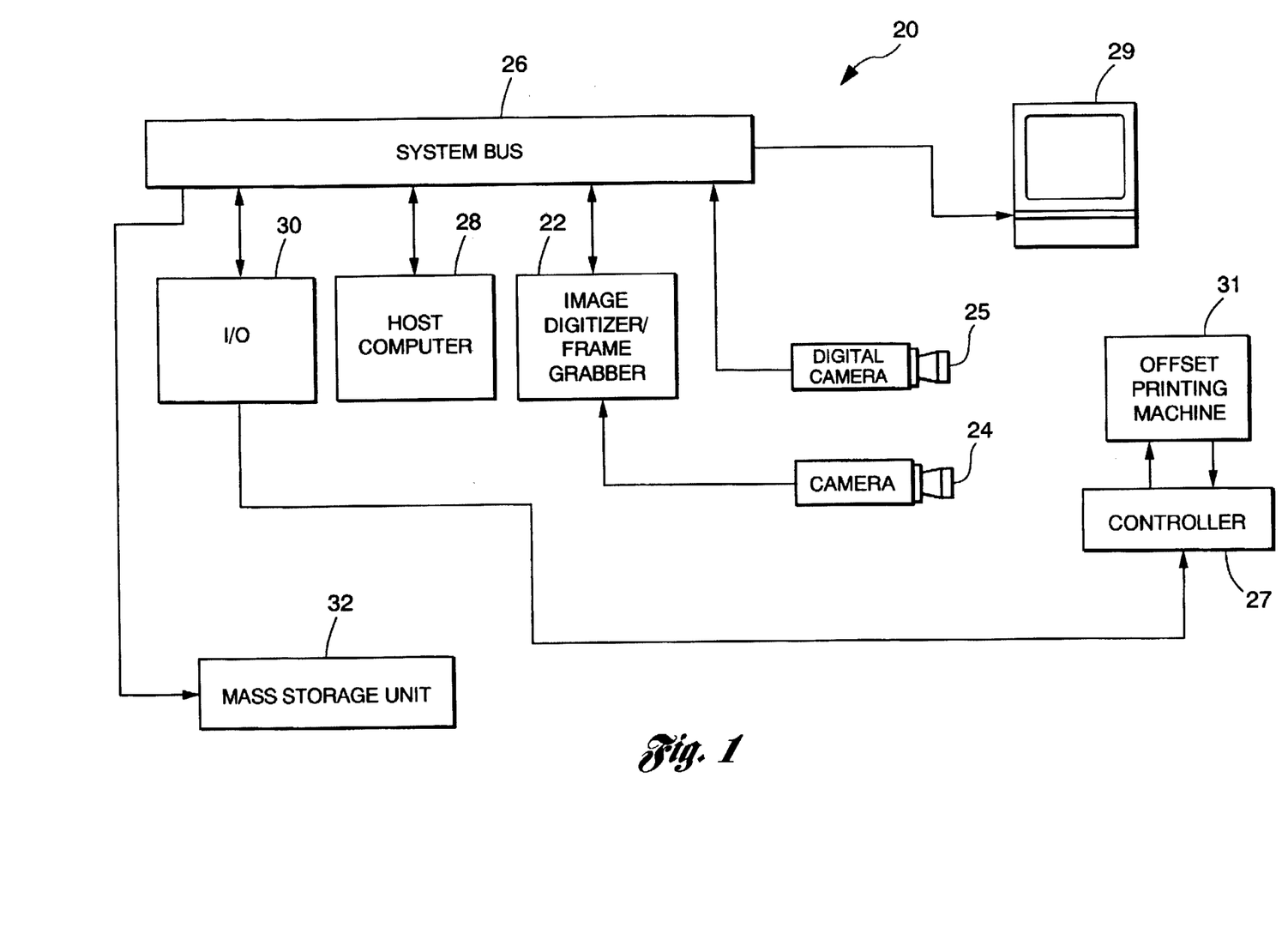
FIG. 1 is a schematic diagram illustrating a machine vision system and station at which the method and system of the present invention can automatically monitor colors of an object.

Referring now to the drawing Figures, there is illustrated schematically in FIG. 1, a machine vision system and station, generally indicated at 20, by which the method and system of the present invention can automatically monitor colors of an object. The machine vision system 20 typically includes an image digitizer/frame grabber 22. The image digitizer/frame grabber 22 samples and digitizes input images from an image source such as a camera 24 and places each input image into a frame buffer having picture elements. Each of the picture elements may consist of an 8-bit number representing the brightness of that spot in the image. A digital camera 25 may be provided to eliminate the need for the image digitizer/frame grabber 22.

The system 20 also includes input/output circuits 30 to allow the system 20 to communicate with external devices such as a controller 27 for controlling an offset printing machine 31.

The camera 24 may be an image source such as an analog, digital or line scan camera such as RS-170, CCIR, NTSC and PAL.

The system bus 26 may be either a PCI an EISA, ISA or VL system bus or any other standard bus to allow inter-system communication such as at a monitor 29 of the system 20.

The image digitizer/frame grabber 22 may be a conventional frame grabber board such as that manufactured by Matrox, Cognex, Data Translation or other frame grabbers. Alternatively, the image digitizer/frame grabber 22 may comprise a vision processor board such as made by Cognex.

The machine vision system 20 may be programmed at a mass storage unit 32 to include custom controls for image processing and image analysis. Examples of image processing may include linear and non-linear enhancement, morphology, color and image arithmetic. Also, image analysis may include search, edge, caliper, blob, template, color, 2-D and 3-D measurements.

A computer 28 of the system 20 may be a Pentium-based IBM compatible PC or other PC having a sufficient amount of RAM and hard disk space for performing the algorithms associated with the present invention.

Learning The Ink Axes

Figure 2:
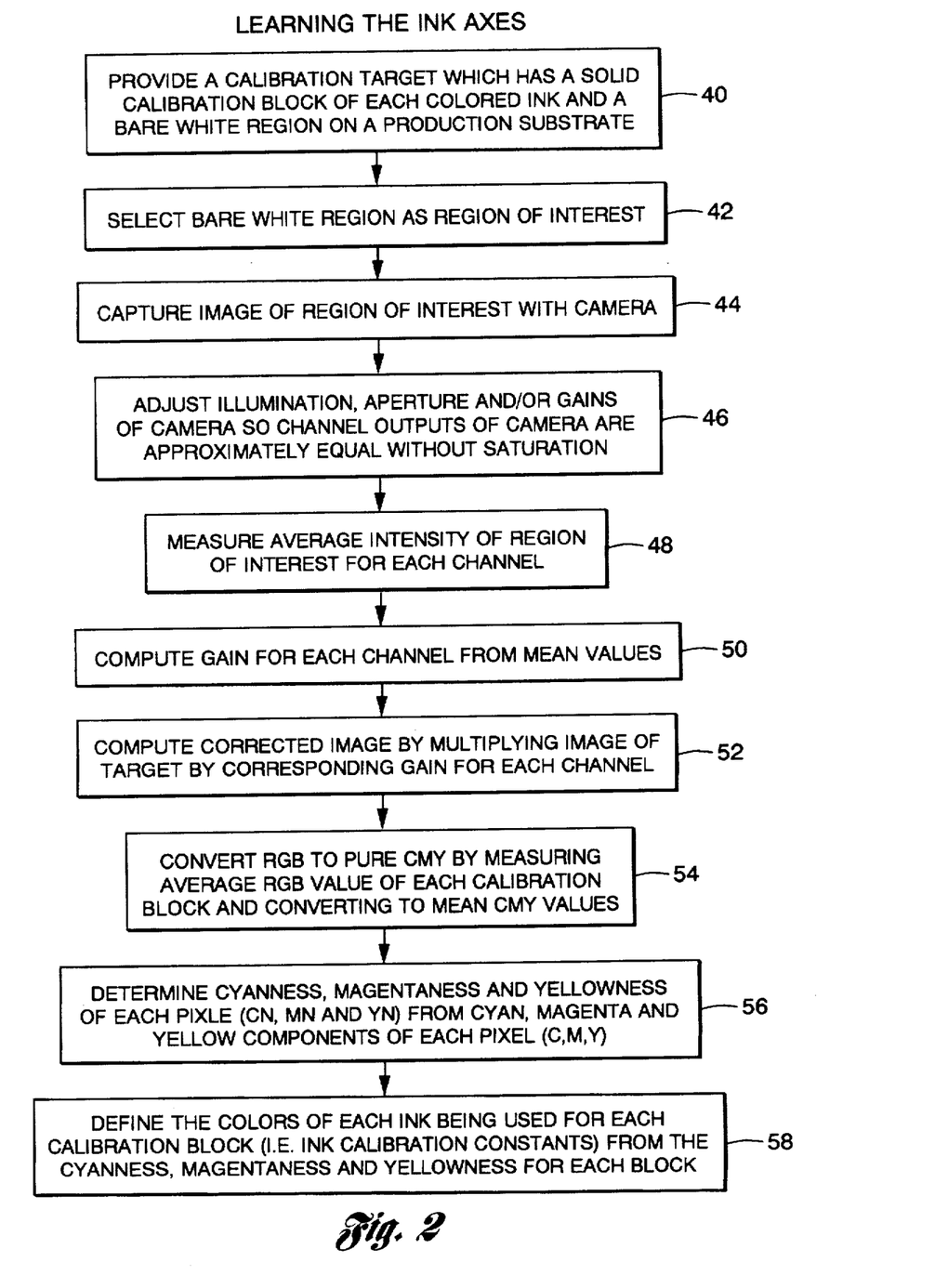
FIG. 2 is a block diagram flow chart illustrating an ink axis learning algorithm of the present invention.

Referring now to FIG. 2, there is illustrated in block diagram flow chart form a learning-the-ink-axes algorithm for use with the method and system of the present invention.

In order to teach the system the position of the ink colors in a chosen color space, it is necessary to provide a specialty printed target(s) at block 40. Ideally, this should consist of a simple block of each of the inks printed as a solid block (i.e. 100% coverage) preferably printed on the same substrate as is going to be used in a production run.

In order to ensure that the colors are measured under standard conditions, there should be a region of bare white substrate on which the system can calibrate itself at block 42. It is assumed that the target is a simple white area containing 4 colored blocks, printed in cyan ink, magenta ink, yellow ink and black ink. One first selects a region of interest consisting of the bare white substrate.

At block 44, this subimage is captured.

At block 46, the illumination, aperture and/or gains of the color camera 24 are adjusted so that the outputs are approximately equal, but more important are not running the camera 24 and following electronics into saturation. It is vital that the system should be operated in its "linear" region.

At block 48, when this has been set up, the average intensity of the white region of interest is measured for the Red, Green and Blue channels of the camera 24. At block 50, the individual gains are then computed as:

$$\gamma_{red} = \frac{225}{\mu_{red}}$$

$$\gamma_{green} = \frac{225}{\mu_{green}}$$

$$\gamma_{blue} = \frac{225}{\mu_{blue}}$$

Here, $\gamma$ are the gains and $\mu$ are the mean values for the white calibration zone.

At block 52, the complete image of the calibration target is processed by multiplying by the relevant gain as shown below:

$$Corrected\_Image_{red_{row,column}} = Image_{red_{row,column}} \gamma_{red}$$

$$Corrected\_Image_{green_{row,column}} = Image_{green_{row,column}} \gamma_{green}$$

$$Corrected\_Image_{blue_{row,column}} = Image_{blue_{row,column}} \gamma_{blue}$$

At block 54, RGB is converted to pure CMY. Cyan is simply the absence of red; magenta is the absence of green; and yellow is the absence of blue. The following process is undertaken on the 4 calibration blocks, a region of interest being selected which only contains the calibration block being processed. The average R, G and B value of the four blocks is measured and these are converted to the mean cyan, magenta, yellow values using the following transformation:

$$\mu_{Cyan} = 255 - \mu_{Red}$$

$$\mu_{Magenta} = 255 - \mu_{Green}$$

$$\mu_{Yellow} = 225 - \mu_{blue}$$

In an ideal situation, where the ink blocks were spectrally pure, then except for the black ink, each set of means would only have one entry. For example, the cyan block means could be expected to be:

$$Cyan\_block\_\mu_{Cyan} = 255$$

$$Cyan\_block\_\mu_{magenta} = 0$$

$$cyan\_block\_\mu_{Yellow} = 0$$

In practice however, this ideal situation is very rarely met. There is almost always a finite amount of all three colors within a solid ink block. As stated earlier, the ink calibration constants can be expressed in virtually any color measurement scheme.

At block 56, following the example of using the intensity normalized colorness coefficients, CYANNESS and MAGENTANESS, the following functions are used:

$$CN(c, m, y) = \frac{c}{\sqrt{c^2 + m^2 + y^2}}$$

$$MN(c, m, y) = \frac{m}{\sqrt{c^2 + m^2 + y^2}}$$

$$YN(c, m, y) = \frac{y}{\sqrt{c^2 + m^2 + y^2}}$$

Where c,m,y represent the cyan, magenta and yellow components of a pixel and CN, MN, and YN represent the CYANNESS, MAGENTANESS and YELLOWNESS color measures of the pixel.

At block 58, from these functions one can exactly define the colors of the inks being used on the ink calibration constants. Thus, for the cyan ink one has:

$$Cyan\_block\_\alpha_{Cyan} = CN(Cyan_{13}\ block\_\mu_{Cyan},$$

$$Cyan\_block\_\mu_{Magenta}, Cyan\_block\_\mu_{Yellow})$$

$$Cyan\_block\_\alpha_{Magenta} = MN(Cyan\_block\_\mu_{Cyan},$$

$$Cyan\_block\_\mu_{Magenta}, Cyan\_block\_\mu_{Yellow})$$

$$Cyan\_block\_\alpha_{Yellow} = YN(Cyan\_block\_\mu_{Cyan},$$

$$Cyan\_block\_\mu_{Magenta}, Cyan\_block\_\mu_{Yellow})$$

Analogous equations exist for the components of the Magenta_block, Yellow_block and Black_block. These numbers are important to the successful generation of a set of decorrelated (i.e. decoupled) pseudo separations (i.e. images) generated from the template image.

Processing The Template Image

Figure 3:
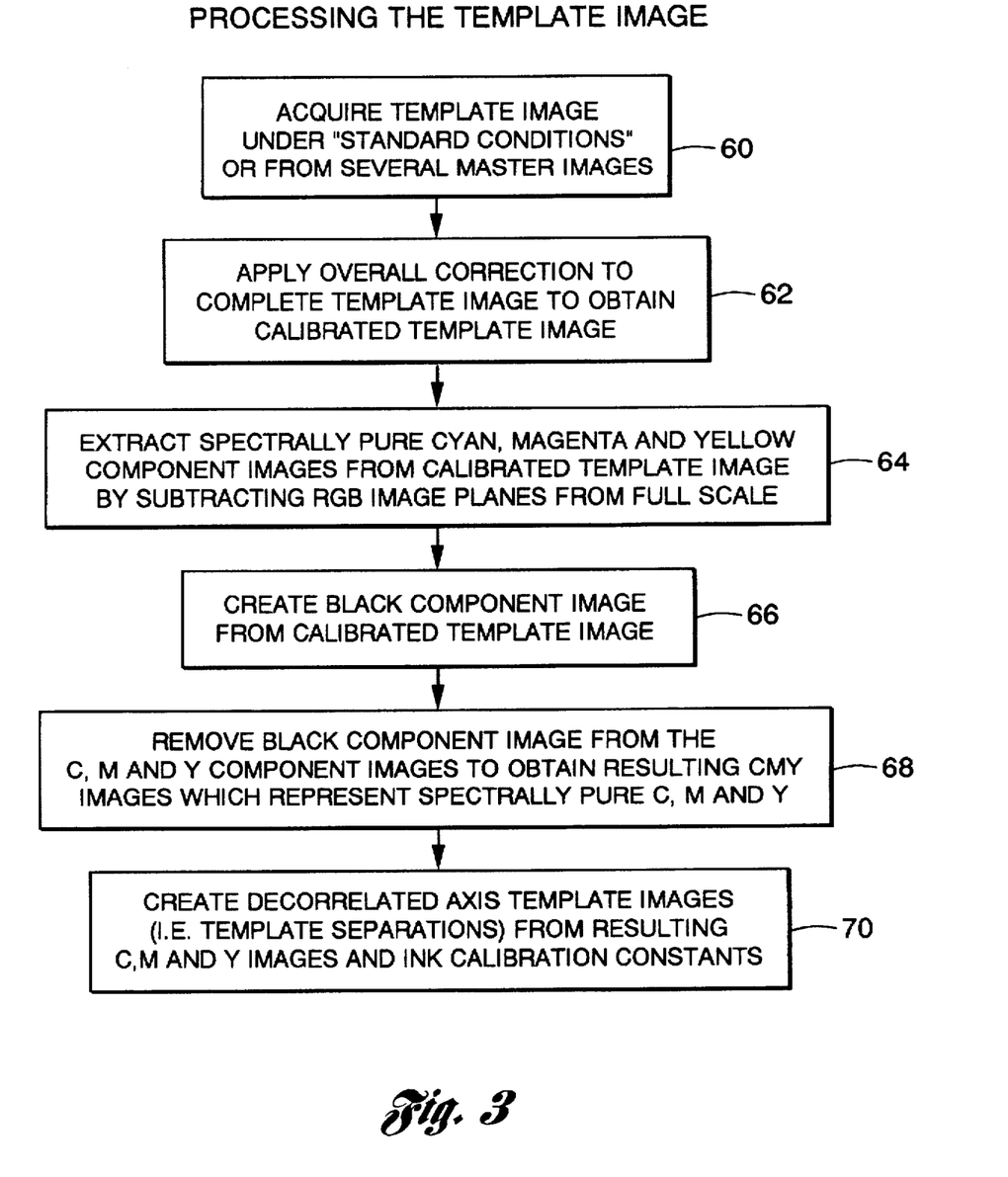
FIG. 3 is a block diagram flow chart illustrating a template image processing algorithm of the present invention.

Referring now to FIG. 3, there is illustrated in block diagram flow chart form, a processing-the-template-image algorithm for use with the method and system of the present invention. The template image is the master to which the overall algorithm attempts to correct the color balance of all subsequent images. It can be either taken from a single master image or else be a composite average taken over a number of acceptable images. As far as this algorithm is concerned, both options are equivalent.

At block 60, the image is acquired under "standard conditions." This requires that either there is a region of pure white substrate visible on the image, else a segment is added into the field of view of the camera 24, but not obscuring any part of the image. The template image can be either a single image or a composite formed from several master images. The acquisition of the template image can include determining the template mean intensities and the standard deviation between several master images.

At block 62, the overall correction that was described in the first part of the previous section will be applied to the complete template image.

At block 64, once the template image has been calibrated to standard conditions, the spectrally pure cyan, magenta and yellow components are extracted by simply subtracting red, green and blue image planes from 255 (i.e. full scale).

At block 66, the next step is to create the black component of the image as a separate image, and remove this from C, M and Y components. This is a two stage process. The first stage removes all of the obvious "black" areas, the second stage is to apply the undercolor removal algorithm. This algorithm takes any pixel with a component in all three color separations and subtracts out a fraction of this common quantity and transfers it into the black separation (i.e., image).

At block 68, the next task is to create a set of separations that do not have the "leakage" between the colored inks. That is, one needs to produce a set of separations that are a measure of the amount of three inks, not a measure of the true cyan, magenta and yellow components. This is done by noting that, for example, the spectrally pure cyan measurement of a pixel can have up to three components: the cyan component of cyan ink; the cyan component of magenta ink; and the cyan component of yellow ink. Expressed mathematically, one gets the following set of linear equations.

$$c = CINK \cdot Cyan\_block\_\alpha_{Cyan} + MINK \cdot Mag\_block\_\alpha_{Cyan} + YINK \cdot Yellow\_block\_\alpha_{Cyan}$$

$$m = CINK \cdot Cyan\_block\_\alpha_{Mag} + MINK \cdot Magenta\_block\_\alpha_{Mag} + YINK \cdot Yellow\_block\_\alpha_{Mag}$$

$$y = CINK \cdot Cyan\_block\_\alpha_{Yell} + MINK \cdot Magenta\_block\_\alpha_{Yell} + YINK \cdot Yellow\_block\_\alpha_{Yell}$$

At block 70, this set of equations, one has the actual values of c, m and y from the spectrally pure separations, and one has the ink calibration constants. What one needs is the actual values of CINK, MINK and YINK that produce these separations (i.e. images). This can be obtained by solving the above equations for each pixel. This produces a set of separations, which together with the key separation generated earlier are the equivalent of the photographic separations originally used to produce the printing plates.

Sample Image Processing

Figure 4:
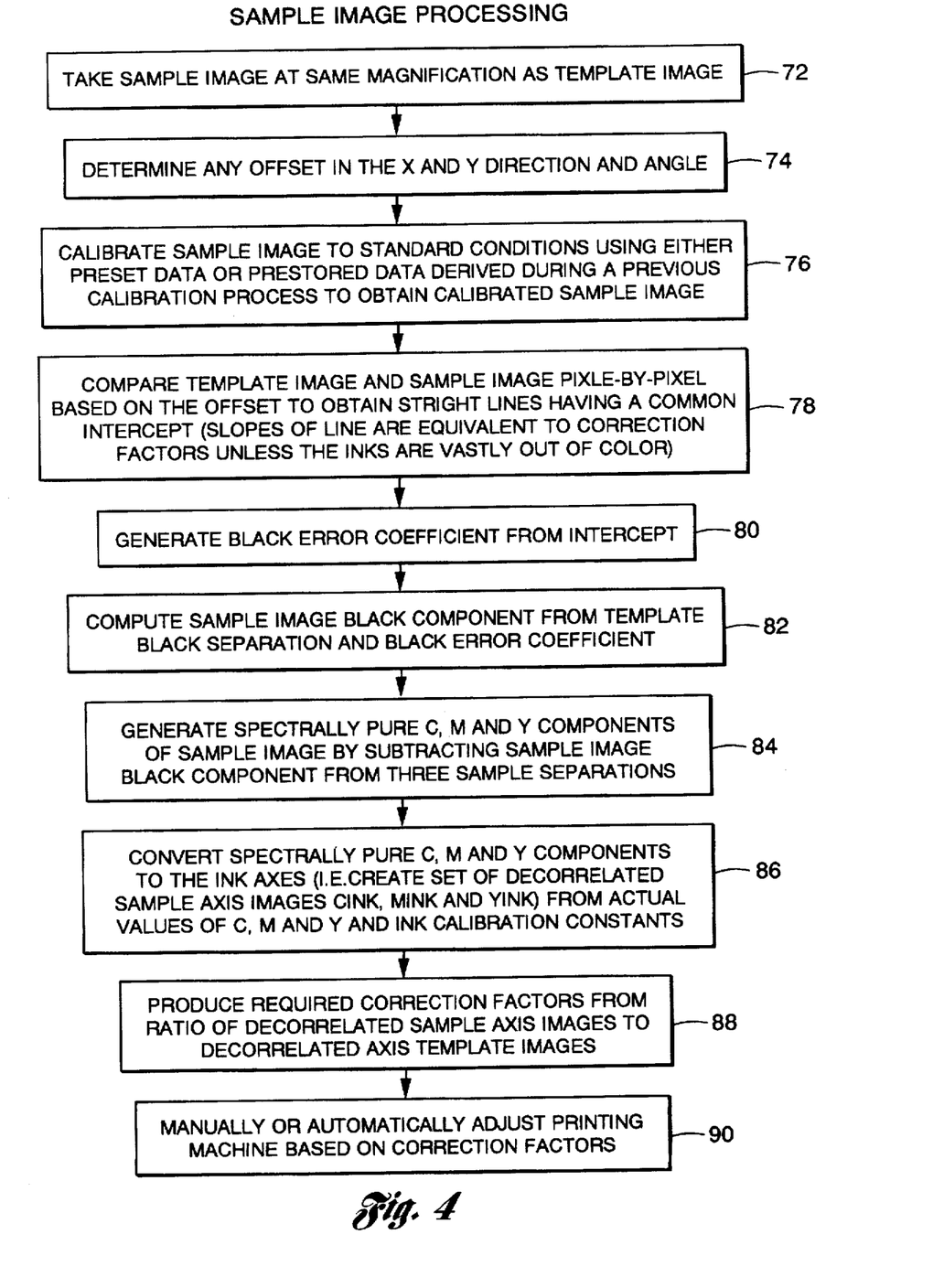
FIG. 4 is a block diagram flow chart illustrating a sample imaging processing algorithm of the present invention.

Referring now to FIG. 4, there is illustrated in block diagram flow chart form a sample image processing algorithm for use with the method and system of the present invention. At block 72, the sample image is taken directly from the printing machine web or printed item. It should be at the same magnification as the template image.

At block 74, exact pixel matching is required, so it is generally necessary to do a pre-alignment process using some method for determining any offset in the x and y direction and angle. Any misregistration in either the x direction, y direction or angle is automatically measured and compensated for thus ensuring pixel level comparison to be made between the template and current images, irrespective of the relative position or rotation between the two images. This is provided automatically by existing programs.

At block 76, the sample image needs to be calibrated to standard conditions using the algorithms previously described, thus requiring either a bare portion of white substrate, else a white target within the field of view of the camera—but not obscuring the sample image. Camera calibration can use either pre-set data, or prestored data derived during a previous calibration process.

As the printing plates have been constructed from the photographic equivalents of the template separations that were described above, any change in color balance is due to the quantity of ink being applied to the printing plates. Assuming for a moment that the printing machine only uses one ink distribution device per color (as would be the case with c.d.'s but not Newspaper printing), then one can model the printing process in the following manner:

$$cSample_{row,column} = \rho_c \cdot cTemplate_{row,column} + \rho_k \cdot kTemplate_{row,column}$$

$$mSample_{row,column} = \rho_m \cdot mTemplate_{row,column} + \rho_k \cdot kTemplate_{row,column}$$

$$ySample_{row,column} = \rho_y \cdot yTemplate_{row,column} + \rho_k \cdot kTemplate_{row,column}$$

At block 78, one can slightly modify the following equations by dividing out by the color template terms and get:

$$\frac{cSample_{row,column}}{cTemplate_{row,column}} = \rho_c + \rho_k \cdot \frac{ktemplate_{row,column}}{ctemplate_{row,column}}$$

$$\frac{mSample_{row,column}}{mTemplate_{row,column}} = \rho_m + \rho_k \cdot \frac{kTemplate_{row,column}}{cTemplate_{row,column}}$$

$$\frac{ySample_{row,column}}{yTemplate_{row,column}} = \rho_y + \rho_k \cdot \frac{kTemplate_{row,column}}{cTemplate_{row,column}}$$

Each of these equations represents a straight line with perhaps 250,000 points, whose slope represents the value $\rho_k$ and the intercept represents $\rho_c$, $\rho_m$, and $\rho_y$, respectively, where $\rho_i$ represents the error factor.

At block 80, one gets three independent measurements of a black error coefficient, which can be averaged to get a marginally more accurate result.

At block 82, now knowing by how much the black value is adrift, one can compute the sample image black component simply by multiplying the template black separation by the error coefficient.

$$kSample_{row,column} = \rho_k \cdot kTemplate_{row,column}$$

At block 84, the resulting image can then be subtracted from the three sample separations to form the spectrally pure Cyan, magenta and Yellow components of the sample image:

$$Sample_{Cyan_{row,column}} = cSample_{row,column} - kSample_{row,column}$$

$$Sample_{Magenta_{row,column}} = mSample_{row,column} - kSample_{row,column}$$

$$Sample_{Yellow_{row,column}} = ySample_{row,column} - kSample_{row,column}$$

At block 86, these results now need to be converted from spectrally pure color to the ink axis by using the transformation detailed earlier:

$c = CINK \cdot Cyan\_block\_\alpha_{Cyan} + MINK \cdot Mag\_block\_\alpha_{Cyan} + YINK \cdot Yellow\_block\_\alpha_{Cyan}$ $m = CINK \cdot Cyan\_block\_\alpha_{Mag} + MINK \cdot Magenta\_block\_\alpha_{Mag} + YINK \cdot Yellow\_block\_\alpha_{Mag}$ $y = CINK \cdot Cyan\_block\_\alpha_{Yell} + MINK \cdot Magenta\_block\_\alpha_{Yell} + YINK \cdot Yellow\_block\_\alpha_{Yell}$ At block 88, the ratio of the decorrelated sample separations to the decorrelated template separations produce the required correction factors.

At block 90, the correction factors are used to adjust the printing machine 31.

Unless the ink's are vastly out in color, the quantities obtained in producing the ratio are not too dissimilar to the original $p_i$ values, which in most cases are sufficiently close to use directly as the correction factors.

While the best mode for carrying out the invention has been described in detail, those familiar with the art to which this invention relates will recognize various alternative designs and embodiments for practicing the invention as defined by the following claims.

What is claimed is:

1. A method for automatically monitoring colors of an object at a vision station including a color camera and a machine, the method comprising the steps of:

generating calibration data based on colors of a calibration target at the vision station;

generating a template image having a plurality of pixels and containing a known good template of colored materials;

utilizing the color camera to generate a current image of the object, the current image having a plurality of pixels and containing the colored materials;

processing the template image, the calibration data and the current image together to obtain a set of correction factors, of the correction factors representing a ratio of an amount of one colored material in the template image to an amount of the one colored material in the current image; and adjusting the machine based on the set of correction factors wherein the step of processing includes the step of comparing corresponding portions of the template and current image on a pixel-by-pixel basis to obtain the set of correction factors, and wherein the template image is a master image to which the step of adjusting attempts to correct color balance of subsequent generated images of the object containing the colored material.

2. The method as claimed in claim 1 wherein the machine is a printing machine.

3. The method as claimed in claim 2 wherein the step of adjusting is performed automatically.

4. The method as claimed in claim 1 wherein the colored materials are cyan, magenta, yellow and black materials.

5. The method as claimed in claim 1 wherein the colored materials are colored inks.

6. The method as claimed in claim 5 wherein the colored inks are cyan, magenta, yellow and black inks.

7. The method as claimed in claim 1 wherein the step of processing includes the step of creating a set of decorrelated axis template images from the template image and the calibration data and creating a set of decorrelated sample axis images from the current image wherein the sets of axis template and sample axis images are processed together during the step of processing to obtain the set of correction factors.

8. The method as claimed in claim 7 wherein the colored materials are black, cyan, magenta and yellow inks and wherein the step of creating the set of decorrelated axis template images includes the step of creating black, cyan, magenta and yellow component images corresponding to black, cyan, magenta and yellow ink components, respectively, of the template image.

9. The method as claimed in claim 8 wherein the step of processing includes the step of modifying the cyan, magenta and yellow component images based on the black component image to obtain resulting cyan, magenta and yellow images.

10. The method as claimed in claim 9 wherein the step of processing includes the step of converting the resulting cyan, magenta and yellow images into the set of decorrelated axis template images.

11. The method as claimed in claim 1 wherein the step of processing includes the step of:

measuring any misregistration between the current and template images to obtain an offset and wherein the step of comparing includes comparing the images pixel-by-pixel based on the offset to obtain a plurality of straight line graphs wherein the correction factors are based on slopes of the straight line graphs.

12. The method as claimed in claim 11 wherein the colored materials are cyan, magenta, yellow and black inks.

13. A system for automatically monitoring colors of an object at a vision station including a machine, the system comprising:

means for generating calibration data based on colors of a calibration target at the vision station;

means for generating a template image having a plurality of pixels and containing a known good template of colored materials;

a color camera for generating a current image of the object, the current image having a plurality of pixels and containing the colored materials;

means for processing the template image, the data and the current image together to obtain a set of correction factors, each of the correction factors representing a ratio of an amount of one colored material in the template image to an amount of the one colored material in the current image; and means for adjusting the machine based on the set of correction factors wherein the means for processing includes means for comparing corresponding portions of the template and current images on a pixel-by-pixel basis to obtain the set of correction factors and wherein the template image is a master image to which the means for adjusting attempts to correct color balance for subsequent generated images of the object containing the colored materials.

14. The system as claimed in claim 13 wherein the machine is a printing machine.

15. The system as claimed in claim 14 wherein the printing machine is adjusted automatically.

16. The system as claimed in claim 13 wherein the colored materials are cyan, magenta, yellow and black materials.

17. The system as claimed in claim 13 wherein the colored materials are colored inks.

18. The system as claimed in claim 17 wherein the colored inks are cyan, magenta, yellow and black inks.

19. The system as claimed in claim 13 wherein the means for processing includes means for creating a set of decorrelated axis template images from the template image and the calibration data and means for creating a set of decorrelated sample axis images from the current image wherein the sets of axis template and sample axis images are processed together by the means for processing to obtain the set of correction factors.

20. The system as claimed in claim 19 wherein the colored materials are black, cyan, magenta and yellow inks and wherein the means for creating the set of decorrelated axis template images includes means for creating black, cyan, magenta and yellow component images corresponding to black, cyan, magenta and yellow ink components, respectively, of the template image.

21. The system as claimed in claim 20 wherein the means for processing includes means for modifying the cyan, magenta and yellow component images based on the black component image to obtain resulting cyan, magenta and yellow images.

22. The system as claimed in claim 21 wherein the means for processing includes means for converting the resulting cyan, magenta and yellow images into the set of decorrelated axis template images.

23. The system as claimed in claim 13 wherein the means for processing includes means for measuring any misregistration between the current and template images to obtain an offset and wherein the means for comparing compares the images pixel-by-pixel based on the offset to obtain a plurality of straight line graphs wherein the correction factors are based on slopes of the straight line graphs.

24. The system as claimed in claim 23 wherein the colored materials are cyan, magenta, yellow and black inks.

25. A method for automatically monitoring colors of an object at a vision station including a color camera, the method comprising the steps of:

generating calibration data based on colors of a calibration target at the vision station;

generating a template image containing a known good template of colored materials;

generating a current image of the object containing the colored materials; and processing the template image, the calibration data and the current image together to obtain a set of correction factors, each of the correction factors representing a ratio of an amount of one colored material in the template image to an amount of the one colored material in the current image; and wherein each of the current and template images includes a plurality of pixels and wherein the step of processing includes the steps of:

measuring any misregistration between the current and template images to obtain an offset and comparing the images pixel-by-pixel based on the offset to obtain a plurality of straight line graphs wherein the correction factors are based on slopes of the straight line graphs.

26. A system for automatically monitoring colors of an object at a vision station including a color camera, the system comprising:

means for generating calibration data based on colors of a calibration target at the vision station;

means for generating a template image containing a known good template of colored materials;

means for generating a current image of the object containing the colored materials; and means for processing the template image, the calibration data and the current image together to obtain a set of correction factors, each of the correction factors representing a ratio of an amount of one colored material in the template image to an amount of the one colored material in the current image; and wherein each of the current and template images includes a plurality of pixels and wherein the means for processing includes means for measuring any misregistration between the current and template images to obtain an offset and means for comparing the images pixel-by-pixel based on the offset to obtain a plurality of straight line graphs wherein the correction factors are based on slopes of the straight line graphs.

* * * * *

UNITED STATES PATENT AND TRADEMARK OFFICE
CERTIFICATE OF CORRECTION

PATENT NO : 5,764,386
DATED : June 9, 1998
INVENTOR(S) : David A. Robinson

It is certified that error appears in the above-identified patent and that said Letters Patent is hereby corrected as shown below:

Claim 1, Column 9, Line 36, before "of" insert --each--.

Claim 13, Column 10, Line 39, after second occurrence of "the" insert --calibration--.

Signed and Sealed this

First Day of December, 1998

Attest:

BRUCE LEHMAN

Attesting Officer

Commissioner of Patents and Trademarks